Dec. 5, 1967  J. H. BRADFUTE ET AL  3,356,376
AXLE SEAL
Filed May 11, 1964  5 Sheets-Sheet 1
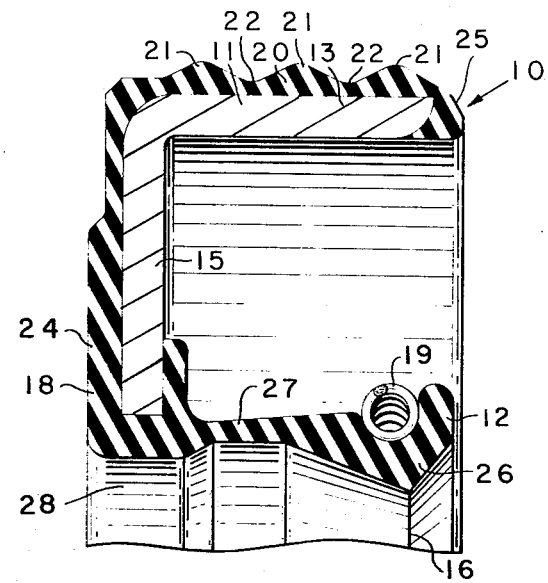
FIG_1
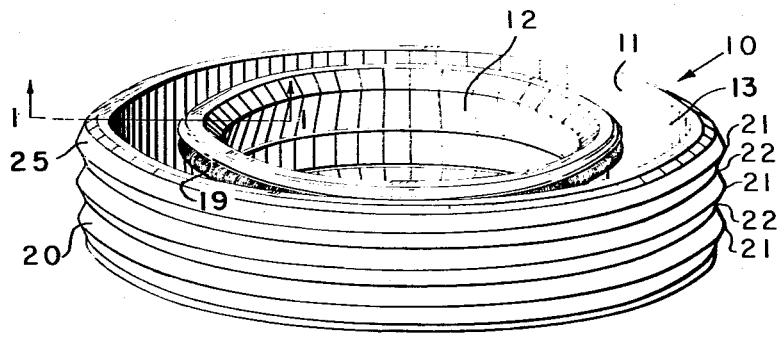
FIG_2
JOHN H. BRADFUTE
BERKELEY E. WARD
INVENTORS
BY
ATTORNEY FIG_3
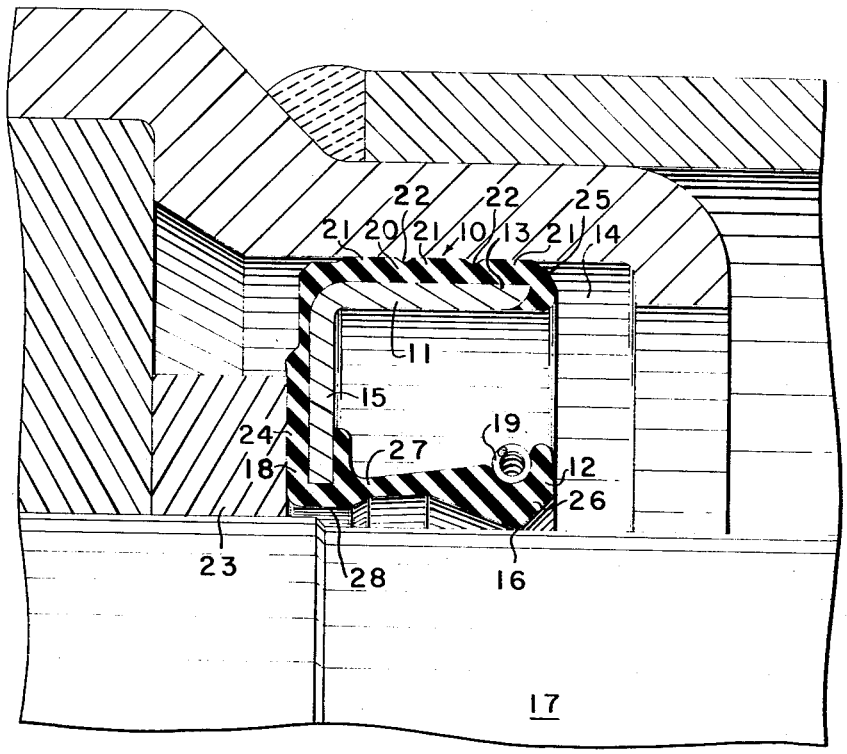

Dec. 5, 1967  J. H. BRADFUTE ETAL  3,356,376
AXLE SEAL
Filed May 11, 1964  5 Sheets-Sheet 3
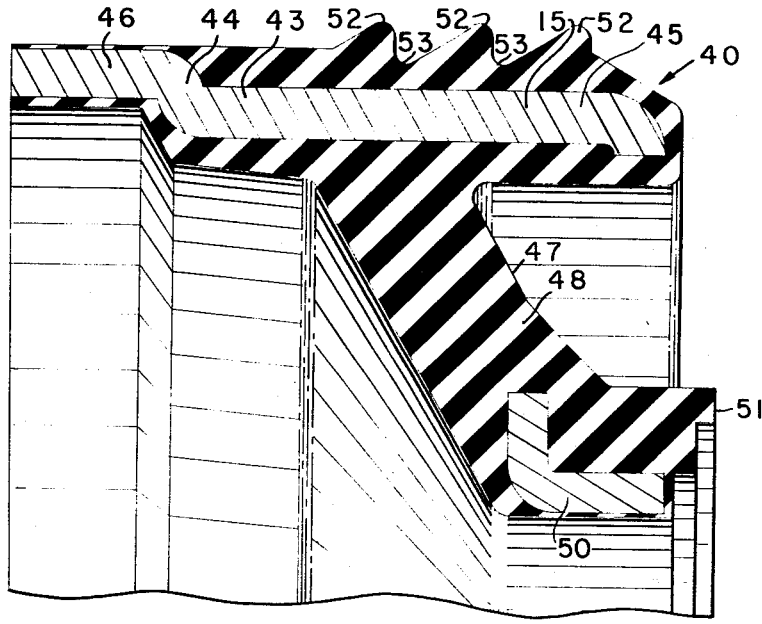
FIG_4
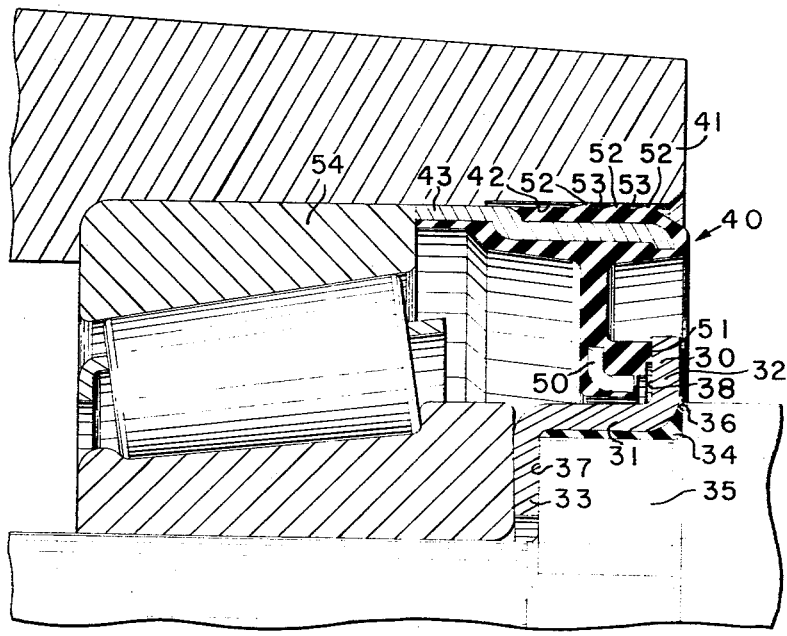
FIG_5
JOHN H. BRADFUTE
BERKELEY E. WARD
INVENTORS
ATTORNEY Dec. 5, 1967 J. H. BRADFUTE ET AL 3,356,376
AXLE SEAL
Filed May 11, 1964 5 Sheets-Sheet 4
FIG_7
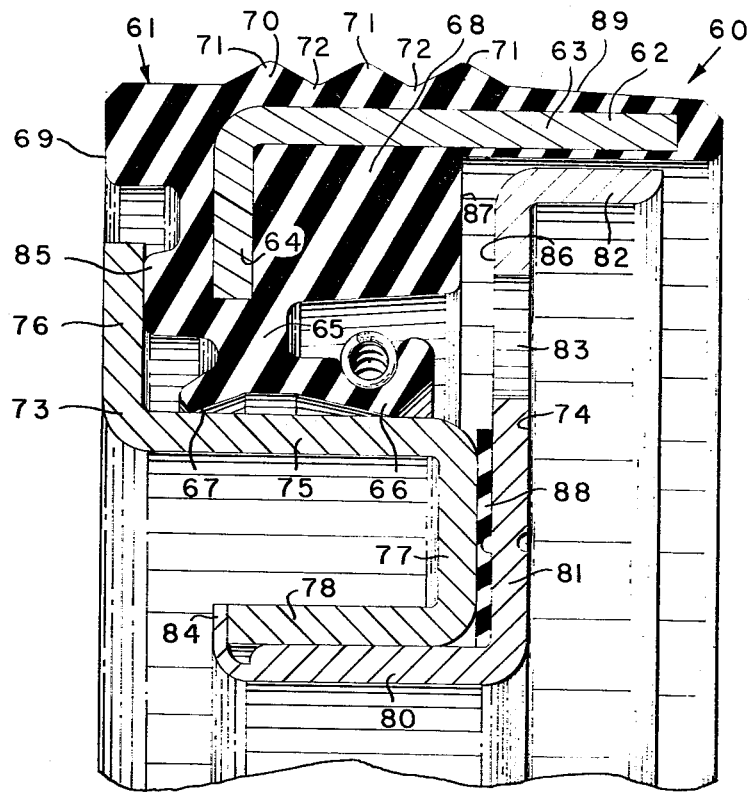
FIG_6
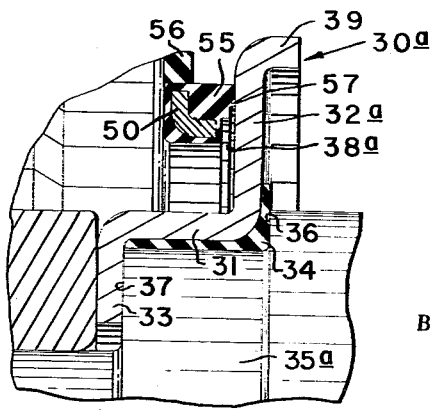
JOHN H. BRADFUTE
BERKELEY E. WARD
INVENTORS
BY
ATTORNEY Dec. 5, 1967　　　J. H. BRADFUTE ET AL　　　3,356,376
AXLE SEAL
Filed May 11, 1964　　　　　　　　　　　　5 Sheets-Sheet 5
FIG_8
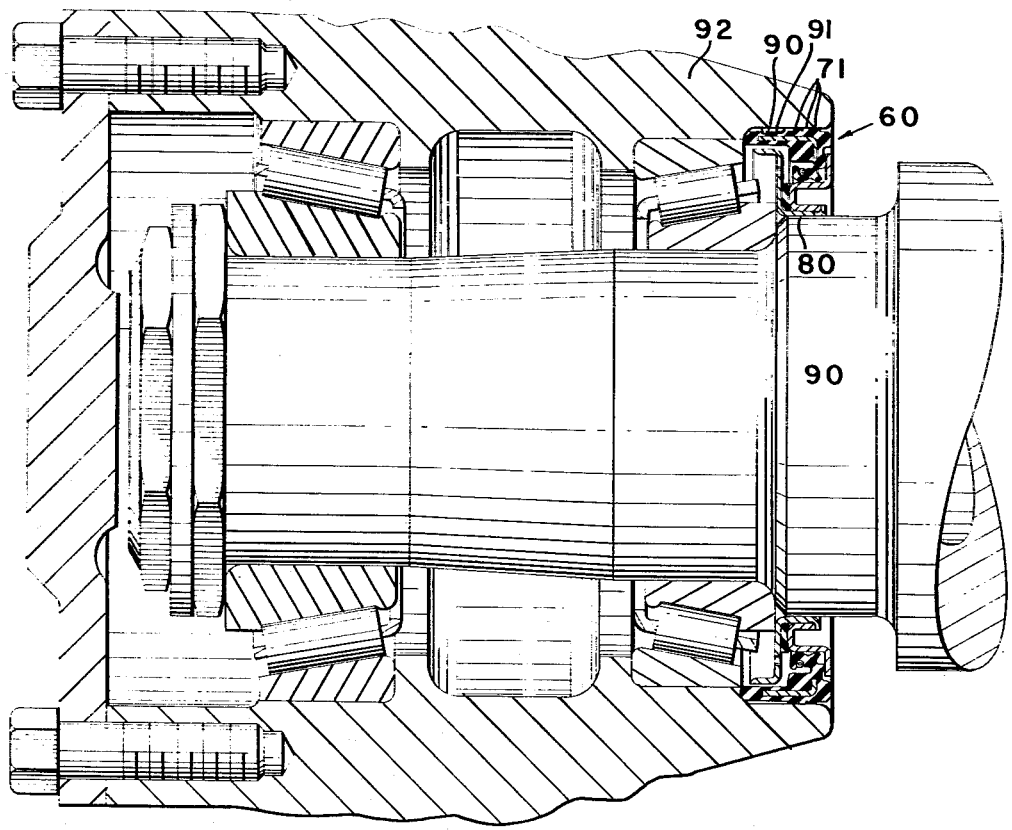
FIG_9
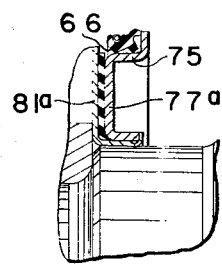
JOHN H. BRADFUTE
BERKELEY E. WARD
INVENTORS
ATTORNEY

| United States Patent Office | 3,356,376
|---|---:|
| | Patented Dec. 5, 1967 |

3,356,376
AXLE SEAL
John H. Bradfute, Santa Clara, and Berkeley E. Ward, Belmont, Calif., assignors to Federal-Mogul Corporation, a corporation of Michigan
Filed May 11, 1964, Ser. No. 366,561
8 Claims. (Cl. 277—37)

This invention relates to an improved lubricant-sealing member of the type installed between a bore wall and a relatively rotatable shaft. More particularly, it relates to improvements in the bore-anchoring portion of shaft seals of both the radial-lip and face types. It also relates to improvements in shaft seal assemblies of the type having a bore-anchored member and a relatively rotatable shaft-supported member, whereby the bore-anchored member may be used with any of a variety of sizes of shaft-supported members.

Shaft seals have typically comprised a rigid case or reinforcing member of metal, and a resilient flexible member of elastomer or leather. The case has been typically inserted into a bore and held there by a press fit, but these press-fit installations have had several disadvantages. Often they have provided a path for lubricant leakage due to scratches, nicks, or pores in either the seal case or the housing bore. Also, if the bore was oversize or if the seal case was undersize, the seal was loose and tended to leak or even to come out when subjected to vibration. Furthermore, installation of the seal has typically required the use of either a press or a hammer, which have tended to deform, destroy, or distort the seal so as to render it inoperable.

As an alternate structure, seals with elastomer-covered cases, the elastomer engaging the bore wall, have been well known in the art, but they have been subject to some of the same disadvantages and they have, moreover, tended to be more easily shaken out from the bore by vibration; when they were small enough relative to the bore to be easily inserted, they tended to come out far too easily and have sometimes shaken out accidentally during use. If they were slightly oversize, installation was difficult and sometimes their elasticity tended to eject them from the bore.

One of the objects of this invention is to improve the bore anchorage of shaft seals while at the same time making their installation easier.

In U.S. Patent 3,110,095, V. L. Peickii has described and claimed a method of installing a shaft seal within a housing without damage to the sealing lip. One of the objects of the present invention is to provide a seal capable of the installation shown in that patent and which, though easily installed, will retain itself in the bore.

Another object of the invention is to provide a seal that accommodates a wide variation in the actual size of the bore. This means that tolerances in bore size can be permitted without causing leakage around the seal or causing loose seals.

Another object is to provide seals wherein a standard bore-fitting structure is combined with any of several sizes of shaft-fitting structures.

Another object of the invention is to provide a shaft seal of a type which can easily and without damage be taken out of a bore when it is desired to remove the seal and can be reinstalled and then give satisfaction. Generally speaking, reinstallation of shaft seals has been advised against, because removal tends to result in destruction of the seal. The present invention provides a seal which can be reinstalled after withdrawal and which can be more easily withdrawn than prior art seals, though it is not liable to come out accidentally.

In the drawings,

FIG. 1 is an enlarged fragmentary view in elevation and in section of a radial-lip type of shaft seal embodying the principles of the invention, taken along the line 1—1 in FIG. 2.

FIG. 2 is a view in perspective of the seal of FIG. 1.

FIG. 3 is a fragmentary view in elevation and in section of the seal of FIGS. 1 and 2 installed in an axle housing and around an axle, in an installation corresponding to that shown in Patent 3,110,095.

FIG. 4 is a view similar to FIG. 1 of a face-type of shaft seal embodying the principles of the invention.

FIG. 5 is a view on a scale smaller than that of FIG. 4 of an installation of the seal of FIG. 4.

FIG. 6 is a fragmentary view in elevation and in section of a portion of a modified form of the seal of FIGS. 4 and 5.

FIG. 7 is a fragmentary view in elevation and in section of a unitized radial-type seal embodying the principles of the invention.

FIG. 8 is a view in elevation and in section, on a scale smaller than that of FIG. 7, of an installation employing the seal of FIG. 7.

FIG. 9 is a fragmentary view in elevation and in section, on the scale of FIG. 8, of a modified form of the seal of FIGS. 7 and 8.

The seal 10 shown in FIGS. 1 to 3 has a rigid case 11 and an elastomeric sealing element 12. The case 11 has a cylindrical portion 13 adapted to fit into a housing bore 14 (FIG. 3), and it also has a radially extending flange 15. The elastomeric sealing element 12 includes a sealing lip 16 urged by a spring 19 to engage a shaft or axle 17 and do the actual rotary sealing, a case anchor portion 18 where it is secured to the radial flange 15 and, in accordance with the present invention, a locking portion 20 by which it is secured in the housing bore 14.

The present invention is characterized by providing a series of circumferential elastomeric ridges 21 and valleys 22 in this locking portion 20 around the outer periphery of the seal and around the outer periphery of the rigid cylindrical portion 13. These ridges 21 are so dimensioned that they are sufficiently deformed during installation in the largest bore 14 in which they might be installed to provide enough radial force to resist turning in the bore 14. At the same time, they are also dimensioned to enable installation in much smaller bores 14, to give a fairly broad range of tolerances for the nominal bore size. The number of ridges 21 is not the important thing, so long as there are at least two ridges 21. The number used depends somewhat upon the axial length available and the range of the bore sizes to be accommodated and other such considerations. Typically, the ridges 21 are about 3/16 inch apart. In radial extent, the dimension from the valleys 22 to the ridges 21 is made so that the minimum housing bore 14 has a radius equal to or greater than the sum of the radius from the center line of the seal to the bottom of the groove 22, plus half of the ridge 21 height. The maximum housing bore 14 radius is equal to the inner radius of the valleys 22 plus 80% of the height of the ridges 21. The precise form of the ridges and valleys is not critical. They may be shaped like a sine wave, or may be like a sawtooth wave, as shown in FIG. 4.

The locking portion 20 is also provided with a tapered entry portion 25 that helps to center the seal 10 in the bore 14 as it enters the bore and also covers the sharp edge at the free end of the metal flange 13, thereby protecting the bond at this critical point. Also, since the metal case 11 is located in the mold by the radial flange 15, the entry portion 25 is extended axially beyond the end of the seal lip portion 26 to protect the lip 16 from installation damage.

In addition, the seal 10 has some other features worthy of notice. The lip 16 and its adjacent body 26 are joined to the case anchor portion 18 by a flex section 27, the length of which helps to accommodate shaft runout. The flex section 27 and the lip body 26 are protected during installation by a sleeve-like guard and guide portion 28 of smaller diameter than the flex section 27, though large enough to avoid contact with the shaft 17 during operation. These features are especially helpful when the seal 10 is used on an automobile rear axle 17.

The installation shown in FIG. 3 is achieved by the method described in Patent 3,110,095. The seal 10 has been installed over the axle 17, protected during installation by the portion 28, adjacent a wedging ring 23, and then when the axle 17 is installed in the bore 14, the seal 10 is carried along with the axle and is moved into the housing bore 14 ahead of the wedging ring 23, which engages an elastomeric bumper portion 24. The entry portion 25 aids installation. The ridges 21 and valleys 22 are able to accommodate a reasonable range of housing bore tolerances, and they enable the seal to stay in the bore 14 once it is put in, even though there may be considerable vibration and other factors that would ordinarily force most seals to come out. The ridges 21 grasp the walls of the bore 14 and hold on better than would a smooth elastomeric lining. After installation, the wedging ring 23 wears off a little of the rubber on the bumper 24 and after that no longer is there any contact between them.

FIGS. 4 and 5 show the invention applied to a face seal structure. One of the face elements 30 may be a pressed steel ring having a cylindrical portion 31 between a radially outwardly extending face-providing flange 32 and a radially inwardly extending anchoring flange 33. The element 30 may have a rubber lining 34 and may be installed separately on an axle 35 for rotation therewith, as shown in FIG. 5, so that the outwardly extending flange 32 may be abutted against a shoulder 36 (if there is such a shoulder), and the inwardly extending flange 33 is abutted against another shoulder 37. The flange 32 has a sealing face 38.

The other face sealing element 40 is stationary with respect to the housing 41 and is installed in the bore 42 thereof. It has a rigid case 43 having, in this instance, a shoulder 44 to enable easier removal and located between two cylindrical portions 45 and 46. The sealing member 40 incorporates what sometimes is termed a "shear sandwich," according to the principles disclosed and claimed in patent application Ser. No. 225,586, filed Sept. 24, 1962. It comprises an elastomeric member 47 bonded to this rigid member and having a generally radially inwardly extending diaphragm 48 (which may be truly radial when installed or may be conical to some extent). At the inner end of the member 47 there is a rigid ring 50 and a face 51, which may be a separate member supported by the elastomeric member 47, or may be, as shown, a part of the elastomeric member 47. The face member 51 rides on and rotates relative to the face 38 of the shaft-mounted face member 30.

In this form of the invention, the outer periphery of the member 40 is again provided with ridges 52 and valleys 53 having the same general properties as the ridges 21 and valleys 22, although of a more serrated shape. The member 40 is installed in a housing or wheel member 41 which goes around the axle 35 with one end in contact with a bearing 54 that is also installed in the bore. During installation the seal member 40 is pushed so that its sealing face 51 comes into contact with the sealing face 38. During removal, the entire wheel 41 is taken away, carrying the element 40 with it. The member 30 may then be removed from the shaft 35, if desired, while the outer member 40 may be removed from the wheel 41 by inserting a screwdriver in and pressing against the inner shoulder 44. This enables reuse of the element 40, while the ridges 52 and valleys 53 hold it securely in the bore 41 during normal use.

FIG. 6 illustrates some additional features of the invention. For one thing, the same sealing element 40 may be used with a variety of shaft sizes, so long as the bore 42 lies within the tolerance range explained in connection with the seal of FIGS. 1–3. Thus, for a smaller shaft 35a, a seal element 30a is used, generally like the element 30, but with a longer outer radial portion 32a providing the sealing face 38a and a terminal stiffening axial flange 39. Many different shaft sizes can be accommodated by changing only the element 30 or 30a, while the element 40 remains unchanged.

Another feature illustrated by FIG. 6 is that the face sealing portion of the element 40, in which the member 50 is embedded, may be a separate plastic member 55 bonded to an elastomer mount 56 at the time the elastomer is molded. The remainder of the member 56 is as shown in FIGS. 4 and 5. This latter expedient enables the use of any of a variety of good face-sealing materials such as a phenolic resin compound for the member 56, with a sealing face 57 prepared in any desired manner. When bonded together, the members 56 and 55 are a unit that looks exactly like the unit 47.

FIGS. 7 and 8 show a unitized seal 60 also embodying the principles of the invention. A sealing element 61 has a case 62 with a cylindrical portion 63 and a radial flange 64. An elastomeric element 65 bonded to the case 62 provides two lips 66 and 67, a substantial anchoring portion 68, a drive portion 69, and an outer peripheral portion 70 with the ridges 71 and valleys 72 of this invention.

This particular unitized seal 60 is also characterized by an ability to use the same sealing element 61 in a variety of installations by varying the wear sleeve assembly. The wear sleeve assembly of FIGS. 7 and 8 comprises two elements 73 and 74 which are put together in such a way as to unitize the seal 60. Thus, the wear sleeve 75 itself is provided by a cyindrical portion of the member 73 lying between a radially outwardly extending flange 76 and a radially inwardly extending flange 77. The radially inwardly extending flange 77 itself leads to a second cylindrical portion 78 which is concentric with the actual wear sleeve 75 on which the lips 66 and 67 ride. Parallel and immediately adjacent to the portion 78 is an inner cylindrical portion 80 of the unitizing member 74 which leads to a radially outwardly extending portion 81, at the outer periphery of which is an outer cylindrical flange 82. Where the bore size is the same and the shaft is smaller, the wear sleeve assembly may include longer flanges 77a and 81a and may be otherwise identical (see FIG. 9). Preferably, a series of holes 83 are bored through the flange 81 substantially opposite to the sealing lip 66.

The seal 60 is unitized by curling a flange portion 84 of the cylindrical portion 80 against the inner cylindrical member 78 of the wear sleeve member 73. The wear sleeve member 73 has its outer radial flange 76 bearing up against a bumper portion 85 of the sealing element 61, which is soon worn away, or else the member 61 is moved away from it so there is no running friction at that surface. At the same time it does serve as a limit, because the bumper 85 prevents the seal element 61 from moving any further to the left, as is shown. The unitizing member 74 provides at the outer radial portion of its radial flange 81 a marginal area 86 against which an elastomeric portion 87 of the element 61 can abut during removal of the seal from the bore, to protect the lip 66. A gasket 88 is provided between the unitizing member 74 and the wear sleeve member 73 to prevent leakage between them.

The ridges 71 and valleys 72 of the outer periphery 70 act identically to the ridges 21 and valleys 22 and again enable simple installation of this seal 60, though the matter of installation is generally somewhat different than that in the other seal. There is a long tapered lead-in portion 89 to aid centering. The installation is done with the portion 80 on the axle or axle housing member 90 which remains normally stationary, and the outer periphery 70 is installed in a bore 91 in the wheel 92 itself. There may be an axle going through the housing 90, or the member 90 may simply be a stationary idling member with the wheel 92 rotating on it. The seal 60 is installed by putting it on the stationary axle 90, obtaining a press fit of the unitizing member 80 at the inner periphery. Then when the wheel 92 is installed around the axle 90, the ridges 71 go in easily, and a wide range of tolerances can again be accommodated. Upon removal of the wheel 92 the unitized seal 60 may be easily removed from the axle 90 and may be replaced.

To those skilled in the art to which this invention relates, many additional changes in construction and widely differing embodiments of the invention will suggest themselves without departing from the spirit and scope of the invention as defined in the claims.

What is claimed is:

1. A shaft seal of the type having a rigid annular metal case with a cylindrical portion and an elastomeric sealing element bonded to said case and having a generally cylindrical portion bonded to the outer periphery of the cylindrical portion of said case to provide a bore-engaging elastomeric portion and a rotatively sealing portion, characterized by a series of circumferential elastomeric ridges and valleys, said valleys providing space into which the elastomer of said ridges extending radially a substantial amount beyond the remainder of said bore-engaging elastomeric portion and can flow when compressed, said ridges serving to retain said seal in a bore and able to accommodate a bore size range from a minimum bore size having a radius at least as large as the sum of the radius of the deepest part of said valley plus half of the ridge height, to a maximum bore size having a radius equal to said radius of the deepest part of said valley plus about eighty percent of the ridge height.

2. In a machine having a housing member providing a cylindrical bore and a relatively rotatable shaft in said housing spaced from the bore, the combination therewith of a shaft seal having a reinforcing cylindrical metal member of slightly less than bore size and having a shaft engaging member, said metal member having an outer peripheral layer of elastomer providing a series of circumferential ridges and valleys, said valleys providing space for the elastomer of said ridges to be moved into and said ridges extending radially beyond the rest of said layer and being the only part of said seal engaging said bore to retain the seal therein, said bore having a radius at least as large as the size of the radius of the seal to the deepest parts of the valleys and one-half of the ridge height thereabove and a radius no greater than the radius of the seal to the deepest parts of the valleys plus 80% of the ridge height thereabove.

3. A shaft seal, including in combination a rigid annular metal case with a cylindrical portion and a radially extending portion and an elastomeric sealing element bonded to both portions of said case and having a generally cylindrical portion bonded to the outer periphery of the cylindrical portion of said case to provide a bore-engaging elastomeric portion having a series of alternating circumferential elastomeric ridges and valleys providing space into which the elastomer of said ridges can flow when compressed, said ridges extending radially beyond the rest of said bore-engaging elastomeric portion and being the only part thereof in sealing engagement with said bore and serving to retain said seal in a bore and able to accommodate a wide range of tolerances in bore size range, from a minimum bore size having a radius at least as large as the sum of the radius of the deepest part of said valley plus half of the ridge height to a maximum bore size having a radius equal to the radius of the deepest part of said valley plus about eighty percent of the ridge height and an axially extending elastomeric sealing portion lying generally parallel to said cylindrical portion and having a shaft-engaging lip and joined to said radially extending portion of the case by a thin flexing portion that is substantially cylindrical and has a free inner periphery and a free outer periphery and lies between a thicker lip portion and a thicker anchoring portion.

4. The shaft seal of claim 3 having a bumper portion of said elastomeric element on the opposite face of said radially extending portion from said cylindrical portion of said case for engagement upon installation of said seal.

5. A shaft sealing assembly adapted to fit in the clearance between a bore and a relatively rotatable shaft, comprising a bore-engaging member having a rotative sealing element adjacent a radially inner periphery and a separate shaft-engaging member having a cylindrical portion for engagement with a said shaft and a surface engaged by said sealing element spaced radially from said cylindrical portion by a radial portion of said shaft-engaging member whose length depends upon the relative size of the shaft and the sealing element, so that a single bore-engaging member can fit any of a series of shaft-engaging members having radial portions of different length and cylindrical portions of different diameter to accommodate different sizes of shaft in a given bore, said bore-engaging member including a reinforcing cylindrical metal member of slightly less than bore size and an outer peripheral layer of elastomer providing a series of circumferential ridges and valleys, said valleys providing space for the elastomer of said ridges to be moved into and said ridges extending radially beyond the rest of said layer and being the only part of said peripheral layer engaging said bore to retain the seal therein and in sealing engagement with said bore.

6. A unitized shaft seal adapted to fit in the clearance between a bore and a relatively rotatable shaft, comprising a bore-engaging member having a lip-type sealing element with a lip at its radially inner periphery and a pair of radial bumpers at each axial end beyond said lip-type sealing element, and a shaft-engaging wear sleeve assembly, comprising a shaft-engaging first cylindrical member for fixedly mounting on the shaft having a radially outwardly extending flange on one end of said seal and a wear sleeve member having a lip-engaging second cylindrical sealing portion and a third cylindrical portion encircling and engaging said first cylindrical portion and spaced radially from said second cylindrical portion by a radially inner radial portion of said wear sleeve member and having a radially outer radial portion on the opposite axial side of said seal from said flange, the length of said inner radial portion depending upon the relative diameters of the shaft and the lip, so that a single bore-engaging member can fit any of a series of shaft-engaging members to accommodate different sizes of shaft in a given bore, said shaft-engaging member and said wear sleeve member being locked together to comprise said shaft-engaging wear sleeve assembly and locking said bore-engaging member between them to unitize said seal.

7. The seal of claim 6 having an elastomeric gasket between said cylindrical member and said wear sleeve member.

8. The seal of claim 6 having in said bore-engaging member a reinforcing cylindrical metal member of slightly less than bore size with an outer peripheral layer of elastomer providing a series of circumferential ridges and valleys, said valleys providing space for the elastomer of said ridges to be moved into and said ridges extending radially beyond said layer and being the only part of said peripheral layer engaging said bore to retain the seal therein and in sealing engagement with said bore.

References Cited

UNITED STATES PATENTS 3,135,518  6/1964  Carson et al. -------- 277—37

FOREIGN PATENTS 859,860  1/1961  Great Britain.
998,478  7/1965  Great Britain.
1,012,939  12/1965  Great Britain.

LAVERNE D. GEIGER, *Primary Examiner.*

D. MASSENBERG, *Assistant Examiner.*

UNITED STATES PATENT OFFICE
CERTIFICATE OF CORRECTION

Patent No. 3,356,376　　　　　　　　　　　December 5, 1967

John H. Bradfute et al.

It is certified that error appears in the above identified patent and that said Letters Patent are hereby corrected as shown below:

Column 5, lines 33 to 35, after "said ridges" cancel "extending radially a substantial amount beyond the remainder of said bore-engaging elastomeric portion and" and insert the same after "said ridges" in line 36, same column 5.

Signed and sealed this 2nd day of September 1969.

(SEAL)
Attest:

Edward M. Fletcher, Jr.　　　　　　　　　WILLIAM E. SCHUYLER, JR.
Attesting Officer　　　　　　　　　　　　　Commissioner of Patents